US012579488B2

(12) United States Patent
Janiczek

(10) Patent No.: US 12,579,488 B2
(45) Date of Patent: Mar. 17, 2026

(54) METHODS AND SYSTEMS FOR OPTIMIZING VALUE IN CERTAIN DOMAINS

(71) Applicant: Flourish Worldwide, LLC, Denver, CO (US)

(72) Inventor: Joseph Janiczek, Denver, CO (US)

(73) Assignee: Flourish Worldwide, LLC, Denver, CO (US)

( * ) Notice: Subject to any disclaimer, the term of this patent is extended or adjusted under 35 U.S.C. 154(b) by 0 days.

(21) Appl. No.: 18/394,476

(22) Filed: Dec. 22, 2023

(65) Prior Publication Data

US 2024/0177081 A1 May 30, 2024

Related U.S. Application Data

(63) Continuation of application No. 17/886,608, filed on Aug. 12, 2022, now Pat. No. 11,875,286.

(51) Int. Cl.
| | |
|---|---|
| *G06Q 10/0631* | (2023.01) |
| *G06F 3/0482* | (2013.01) |
| *G06Q 10/0639* | (2023.01) |
| *G06Q 10/109* | (2023.01) |

(52) U.S. Cl.
CPC ...... *G06Q 10/06311* (2013.01); *G06F 3/0482* (2013.01); *G06Q 10/063114* (2013.01); *G06Q 10/06398* (2013.01); *G06Q 10/1097* (2013.01)

(58) Field of Classification Search
CPC ......... G06Q 10/06311; G06Q 10/0637; G06N 3/08; G06N 3/045
USPC ............................................... 705/7.13, 7.42
See application file for complete search history.

(56) References Cited

U.S. PATENT DOCUMENTS

| | | | |
|---|---|---|---|
| 8,515,334 B1 | 8/2013 | Wendkos et al. | |
| 10,510,026 B1 | 12/2019 | Adamson et al. | |
| 10,902,341 B1 * | 1/2021 | Qureshi | G06Q 10/10 |
| 11,151,891 B2 | 10/2021 | Le Chevalier | |

(Continued)

FOREIGN PATENT DOCUMENTS

| | | |
|---|---|---|
| WO | 2000043972 | 7/2000 |
| WO | 2020145994 | 7/2020 |
| WO | 2020198392 | 10/2020 |

OTHER PUBLICATIONS

Xiaodong Feng, Zhen Liu, Wenbing Wu, Wenbo Zuo, Social recommendation via deep neural network-based multi-task learning, Expert Systems with Applications, vol. 206, 2022, 117755, ISSN 0957-4174, https://doi.org/10.1016/j.eswa.2022.117755 (Year: 2022).*

(Continued)

*Primary Examiner* — Rutao Wu
*Assistant Examiner* — Letoria G Knight
(74) *Attorney, Agent, or Firm* — CALDWELL LLC

(57) ABSTRACT

Aspects of the present disclosure generally relates to a method including receiving group data and identifying at least a domain target for the at least a domain as a function of the domain-specific data. Also, the method may include generating a plurality of candidate schedules. Further, the method may include selecting one or more recommendations from the plurality of candidate schedules. Moreover, the method may include presenting, at a remote device, the one or more recommendations to a group, and tracking, by the computing device, a group's progress with regard to the optimal group schedule.

20 Claims, 13 Drawing Sheets

(56) References Cited

U.S. PATENT DOCUMENTS

| | | | |
|---|---|---|---|
| 11,556,837 B2 | 1/2023 | Wu et al. | |
| 11,635,884 B1 * | 4/2023 | Beauchamp | G06F 3/04847 |
| | | | 715/753 |
| 2006/0014131 A1 | 1/2006 | Bigus | |
| 2015/0206441 A1 | 7/2015 | Brown | |
| 2015/0364057 A1 * | 12/2015 | Catani | G16H 10/60 |
| | | | 434/262 |
| 2018/0130007 A1 | 5/2018 | Fowler et al. | |
| 2019/0272550 A1 * | 9/2019 | Souders | G06Q 30/0271 |
| 2019/0340579 A1 * | 11/2019 | Krystek | G06N 5/022 |
| 2019/0385470 A1 | 12/2019 | Le Chevalier | |
| 2020/0036783 A1 | 1/2020 | Bourassa et al. | |
| 2020/0234606 A1 | 7/2020 | Anders | |
| 2020/0293564 A1 * | 9/2020 | Reh | G06N 3/092 |
| 2020/0334567 A1 | 10/2020 | Bhattacharjee et al. | |
| 2020/0334580 A1 * | 10/2020 | Sheopuri | G06F 40/56 |
| 2021/0105241 A1 * | 4/2021 | Vardhan | H04L 51/214 |
| 2021/0149671 A1 | 5/2021 | Sar Shalom et al. | |
| 2021/0193302 A1 | 6/2021 | Day et al. | |
| 2021/0224753 A1 | 7/2021 | Nasir | |
| 2021/0248696 A1 * | 8/2021 | Reis | G06F 16/248 |
| 2022/0016480 A1 * | 1/2022 | Bissonnette | A63B 24/0062 |
| 2022/0067551 A1 * | 3/2022 | Wei | G06N 5/046 |
| 2022/0107952 A1 * | 4/2022 | Neumann | G06F 9/451 |
| 2022/0301020 A1 | 9/2022 | Jiang et al. | |
| 2023/0359884 A1 * | 11/2023 | Prasad | G06N 3/0442 |
| 2024/0045912 A1 * | 2/2024 | Benkreira | G06F 16/9537 |

OTHER PUBLICATIONS

Shehba Shahab, Next Level: A Course Recommender System Based on Career Interests , May 20, 2019.
Ilker Koksal, The Rise of Online Learning, May 2, 2020.

* cited by examiner

200

| Vocational 204 | Marriage 208 | Family 212 |
| Health 216 | Virtue 220 | Emotional 224 |
| Financial 228 | Spiritual 232 | Intellectual 236 |
| Lifestyle 240 | Interest 244 | Social 248 |

FIG. 2

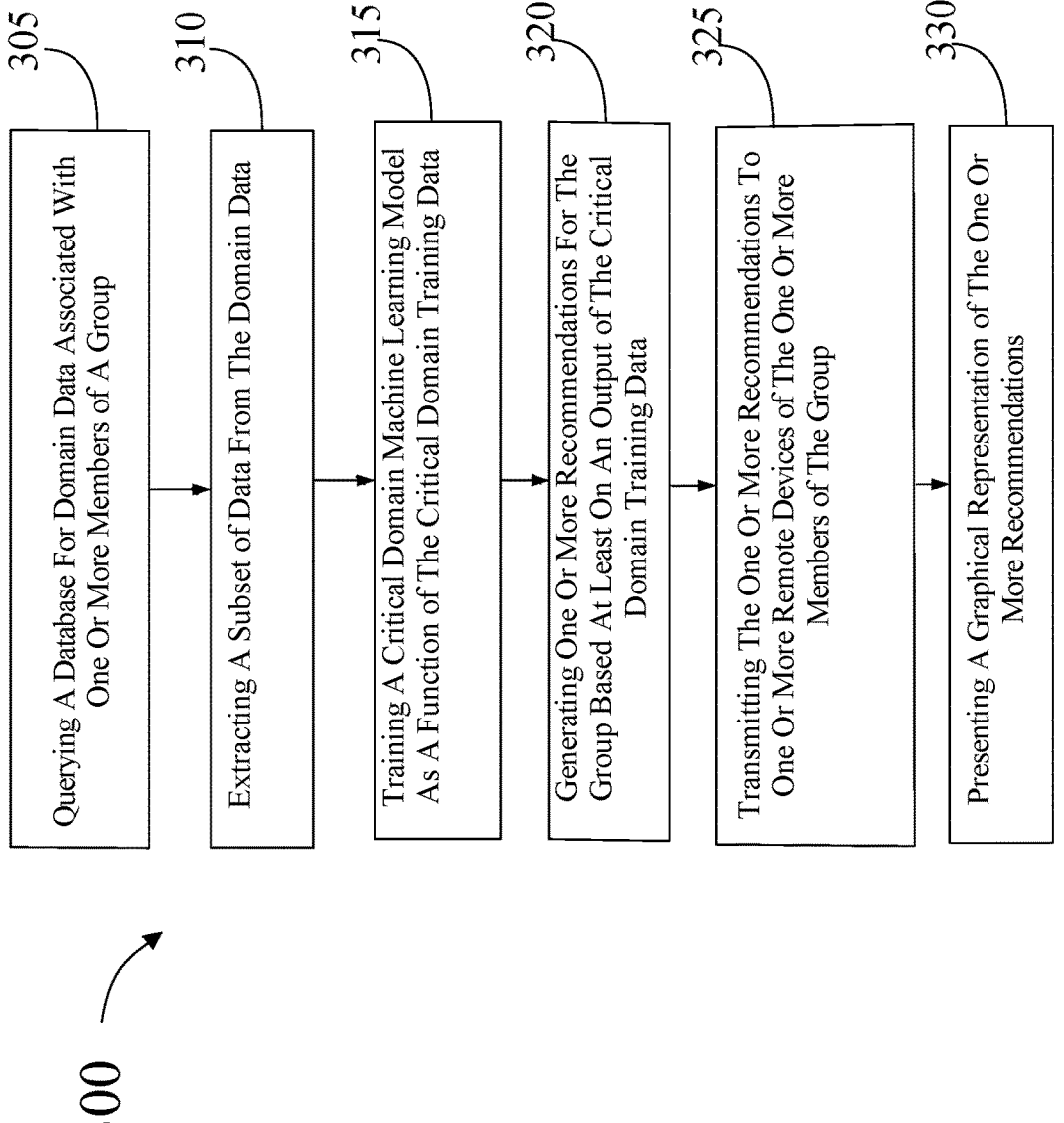

305

Querying A Database For Domain Data Associated With One Or More Members of A Group

310

Extracting A Subset of Data From The Domain Data

315

Training A Critical Domain Machine Learning Model As A Function of The Critical Domain Training Data

320

Generating One Or More Recommendations For The Group Based At Least On An Output of The Critical Domain Training Data

325

Transmitting The One Or More Recommendations To One Or More Remote Devices of The One Or More Members of The Group

330

Presenting A Graphical Representation of The One Or More Recommendations

| OVERVIEW | FOCUS | SOLVE | FLOW |

TODAY

⊕ HABITS/PRODUCTIVITY HACKS ∧

Vocational Well-Being 〉

Lifestyle Well-Being 〉

⊕ ROCKS 〈

Spiritual Well-Being 〉

Health Well-Being 〉

Vocational Well-Being 〉

HOME   GUIDANCE   INSIGHT   MORE

METHODS AND SYSTEMS FOR OPTIMIZING VALUE IN CERTAIN DOMAINS

CROSS-REFERENCE TO RELATED APPLICATIONS

This application is a continuation of Non-provisional application Ser. No. 17/886,608 filed on Aug. 12, 2022, and entitled "METHODS AND SYSTEMS FOR OPTIMIZING VALUE IN CERTAIN DOMAINS," the entirety of which is incorporated herein by reference.

FIELD OF THE INVENTION

The present invention generally relates to the field of AI & Simulation/Modeling. In particular, the present invention is directed to methods and systems for optimizing value in a certain domain for a group and/or each member of the group.

BACKGROUND

Many common domains are present within members of a group. Struggling within one of the common domains may cause a member of the group to struggle with other domains specific to them. On the other hand, underperforming in a domain specific to a member may cause them to underperform in a domain shared by the group. As such, it may be desirable to optimize value for a group and each member within the group.

SUMMARY OF THE DISCLOSURE

In an aspect, a method of optimizing value within certain domains includes providing, at a computing device, domain data associated with one or more members of a group, wherein the plurality of domain data is associated with a plurality of domains, extracting, by the computing device, a subset of data from the domain data, wherein the subset of data comprises critical domain data, generating, by the computing device, one or more recommendations for the group based at least on an output of the critical domain machine learning model, and presenting, by the one or more remote devices, a graphical representation of the one or more recommendations in a graphical user interface, wherein the graphical user interface is configured to switch between a plurality of views upon user selection of display elements corresponding to each view of the plurality of views, the plurality of views includes at least a first view and a second view, the graphical user interface is configured to display a first plurality of display elements in the first view, wherein the first plurality of display elements includes a display element for each domain of the plurality of domains, and the graphical user interface is configured to display a second plurality of display elements in the second view, wherein the second plurality of domain elements excludes at least one display element of the first plurality of display elements.

In another aspect, an apparatus for optimizing value within certain domains includes a memory, the memory storing instructions and one or more processors, the one or more processors configured to execute instructions stored in the memory, the instructions, when executed, cause the one or more processors to perform operations, the operations including providing, at a computing device, domain data associated with one or more members of a group, wherein the plurality of domain data is associated with a plurality of domains, extracting, by the computing device, a subset of data from the domain data, wherein the subset of data comprises critical domain data, generating, by the computing device, one or more recommendations for the group based at least on an output of the critical domain machine learning model, and presenting, by the one or more remote devices, a graphical representation of the one or more recommendations in a graphical user interface, wherein the graphical user interface is configured to switch between a plurality of views upon user selection of display elements corresponding to each view of the plurality of views, the plurality of views includes at least a first view and a second view, the graphical user interface is configured to display a first plurality of display elements in the first view, wherein the first plurality of display elements includes a display element for each domain of the plurality of domains, and the graphical user interface is configured to display a second plurality of display elements in the second view, wherein the second plurality of domain elements excludes at least one display element of the first plurality of display elements.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 is a table illustrating exemplary domains;

FIG. 3 is a flow diagram of an exemplary method of personalizing an interactive curriculum for a group;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for exploiting value in certain domains. In an embodiment, a group may select certain domains that are preferential for exploitation. The present disclosure represents a practical application of exploiting value in certain domains, in part, by allowing groups to automatically have targets for domains and schedules generated. Additionally, the disclosure teaches an improvement of present computing systems as these automated task may be performed on a device other than the group's local device allowing access to larger computing powers and higher levels of automation.

Aspects of the present disclosure can be used to set targets to achieve with respect to certain domains. Aspects of the present disclosure can also be used to schedule plans in order to progress toward achievement of targets. This is so, at least in part, because in some embodiments schedules may be generated as a function of domain targets.

Aspects of the present disclosure allow for improving status within one or more domains. Exemplary embodiments illustrating aspects of the present disclosure are described below in the context of several specific examples.

Figure 1:
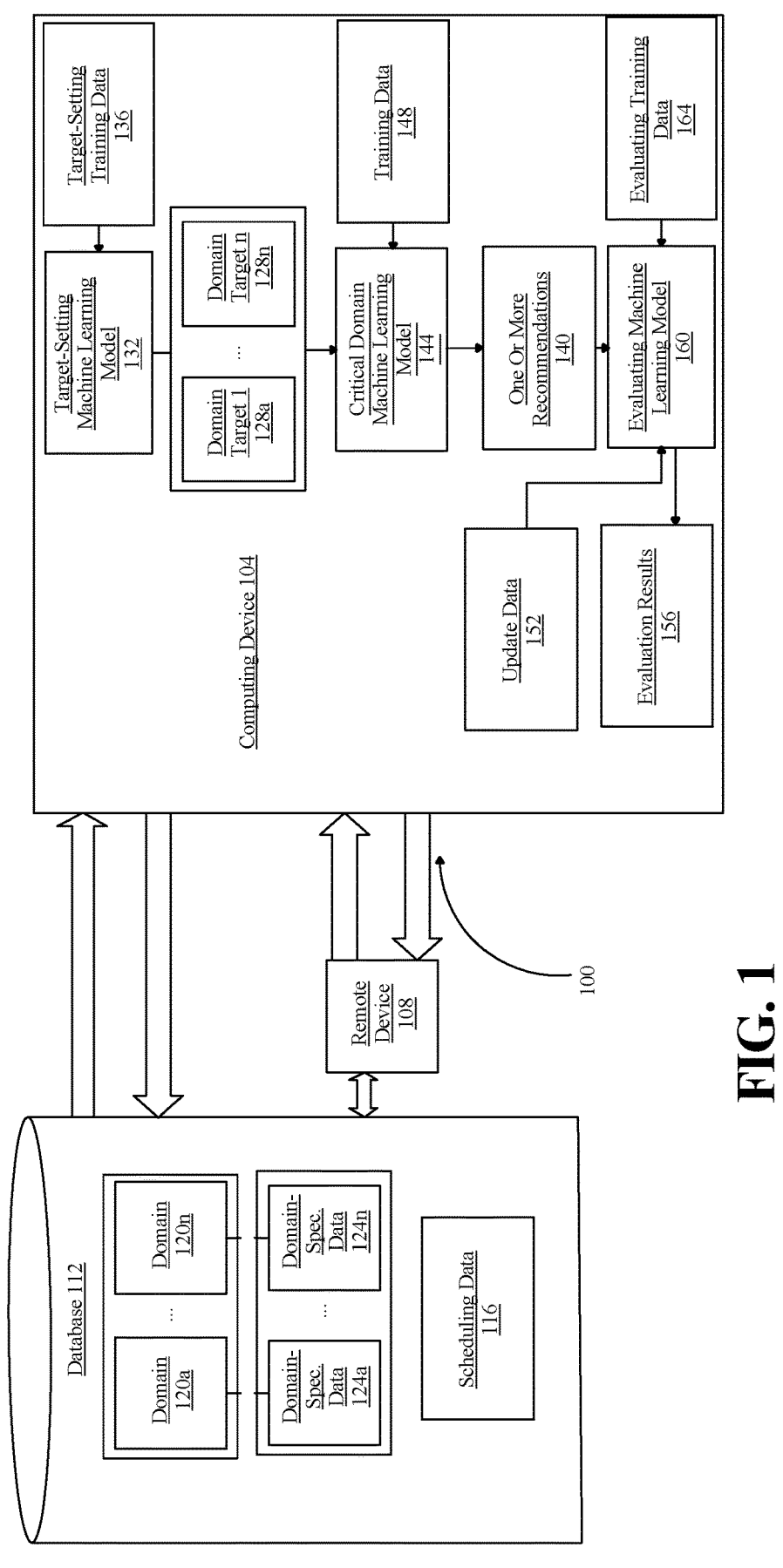
FIG. 1 is a block diagram illustrating an exemplary apparatus for exploiting value in certain domains.

Referring now to FIG. 1, an exemplary embodiment of an apparatus 100 for exploiting value in certain domains is illustrated. Apparatus 100 includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may include a remote device 108. As used in this disclosure, a "remote device" is a computing device that is remote to another computing device. In some cases, a remote device 108 may be in communication with computing device 104 for example by way of one or more networks. One or more networks may include any network described in this disclosure, for instance networks described in reference to FIG. 9. In some cases, remote device 108 may include a personal computing device, such as without limitation a smart phone, a tablet, a desktop, a laptop, or the like.

With continued reference to FIG. 1, apparatus 100 may interrogate remote device 108 and/or database 112 for group data. "Interrogating," as used in this disclosure, is an act of prompting for a response. In some cases, interrogating may include displaying multiple prompts, such as without limitation fields, drop-down boxes, check boxes, radio switches, and the like. In some cases, interrogating may be performed according to a set of prompts, for instance as with a questionnaire. "Group data," as used in this disclosure, is data that is associated with a group. In some cases, group data may include scheduling data 116. As used in this disclosure, "scheduling data" is information associated with a schedule. For instance scheduling data may include days and times which a group is busy or free. In some cases, scheduling data may include calendar data, such as without limitation an Outlook calendar file, a Google calendar file, an Apple calendar file, and the like. In some cases, scheduling data may include an invite, for example an Outlook invite. In some cases, scheduling data may include temporal data (i.e., when), spatial data (i.e., where), personnel data (i.e., with whom), and the like. A group may be two or more individuals within a shared department. For example, a group may be two or more IT specialists within a company. As another non-limiting example, a group may be two or more individuals not within the same department. For example, a group may be an IT specialist, an HR team member, an engineer, or any department within a company and/or enterprise.

Still referring to FIG. 1, database 112 may be implemented, without limitation, as a relational database, a non-relational database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. It should be noted that database 112 may be stored locally or remotely. That is, in some instances database 112 may be stored locally on computing device 104, remote device 108, or both. In other instances, database 112 may be stored remotely on one or more servers. One or more servers may be single-tenant, multi-tenant, or any suitable server organization. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, group data may include at least a domain 120*a-n*. As used in this disclosure, a "domain" is an area of a group's life. Exemplary non-limiting domains include a vocational domain, a marriage domain, a family domain, a health domain, a virtue domain, an emotional domain, a financial domain, a spiritual domain, an intellectual domain, a lifestyle domain, an interest domain, and a social domain. Domain may include any domain described in this disclosure, including those described with reference to FIG. 2.

With continued reference to FIG. 1, computing device 104 may receive group data, such as one or more of scheduling data 116 and at least a domain 120*a-n* from group by way of remote device 108. Alternatively or additionally, computing device 104 may receive group data from a third party on a remote device 108 and/or a local device 104. In some cases, at least a domain 120*a-n* may include at least one domain 120*a* and no more than a predetermined maximum number of domains. As used in this disclosure, a "predetermined maximum number of domains" is a high threshold which a group may select for exploitation. In some cases, predetermined maximum number of domains may be within a range of 1 and 15, for instance 10, 5, 4, 3, 2, or 1. In some embodiments, at least one domain 120*a-n* may be associated with domain data. "Domain data," as used herein is information relating an individual and/or group to at least one domain 120. For example, domain data may be information relating an individual in an IT department to a marriage domain. Moreover, and as described herein, domain data may include critical domain data. "Critical domain data," as described in this disclosure is domain data relating an individual and/or group to one or more domains in need of improvement. For example, critical domain data may relate an individual within an HR department to a health domain if the individual is making poor health-related choices. As described in this disclosure, critical domain data may be a subset of domain data. It should be noted that a subset of domain data may be any portion of domain data. That is, a subset of domain data may be a portion of domain data used for a computing operation. For example, a subset of domain data may be data associated with a domain 120*a*. Subset of domain data 120*a* may be used to perform operations on computing device 104 that may calculate various scores, and/or numerical metrics to determine at least a threshold for defining a domain as a critical domain. For example, computing device 104 may query database 112 for a subset of domain data relating to a family domain. Continuing the example, the subset of domain data may be used to calculate an average family domain score for an entire company and/or enterprise. As such, critical domain data may be defined as any score for an individual and/or group within the company and/or enterprise that is below the average for the entire company and/or enterprise.

With continued reference to FIG. 1, database 112 may be communicatively connected to computing device 104 and/or remote device 108. In some embodiments, remote device 108 may interrogate database 112 for domain 120*a-n*, domain specific data 124*a-n*, or any data of the like. In some embodiments, computing device 104 may directly communicate with database 112 to transmit data. In another embodiment, remote device 108 may transmit data to and from database 112 and transmit the data to computing device 104. As described herein, transmission of data between any combination computing device 104, remote device 108, and database 112 may be done via any suitable network.

With continued reference to FIG. 1, apparatus 100 may interrogate group for additional group data, including for example domain-specific data 124*a-n* as a function of at least a domain 120*a-n*. In some cases, each element of domain-specific data 124*a-n* may be associated with a domain of at least a domain 120*a-n*. As used in this disclosure, "domain-specific data" is information that is associated with a domain. Exemplary domain-specific data is described below with reference to twelve separate domains in FIG. 2. Domain-specific data may be evidential and associated with a group's current status within a domain. Alternatively or additionally, domain-specific data may be aspiration and associated with a group's desired status within a domain.

With continued reference to FIG. 1, apparatus 100 may generate at least a domain target 128*a-n* for at least a domain 120*a-n*, for example by using computing device 104. As used in this disclosure, a "domain target" is a goal associated with a domain. In some cases, apparatus 100 may generate at least a domain target 128*a-n* as a function of domain-specific data 124*a-n*. In some cases, each domain target of at least a domain target 128*a-n* may be associated with a domain of at least a domain 120*a-n*. In some embodiments, at least a domain target 128*a-n* includes a quarterly target. As used in this disclosure, a "quarterly target" is a goal that may be strived for within a quarter of a year. In some cases, a quarterly target may represent a longer-term goal or progression than can normally be achieved within a shorter schedule, such as week or a month. In some embodiments, at least a domain target 128*a-n* includes a yearly target. As used in this disclosure, a "yearly target" is a goal that may be strived for within a year. In some cases, a yearly target may represent a longer-term goal or progression than can normally be achieved within a shorter schedule, such as week or a month. In some embodiments, at least a domain target 128*a-n* includes a five-year target. As used in this disclosure, a "five-year target" is a goal that may be strived for within a five-year period. In some cases, a five-year target may represent a longer-term goal or progression than can normally be achieved within a shorter schedule, such as week or a month. In some cases, apparatus 100 may generate at least a domain target 128a-n by using a machine learning process, for example a target-setting machine learning model 132. Target-setting machine learning model 132 may including any machine learning process described in this disclosure, including those described with reference to FIGS. 4-7. In some cases, target-setting machine learning model 132 may include a classifier, such as any classifier described in this disclosure, for example with reference to FIG. 7.

Still referring to FIG. 1, in some embodiments, target-setting machine learning model 132 may receive input including domain-specific data 124a-n. As used in this disclosure, a "target-setting machine learning model" is a machine learning process that takes as input group data, such as domain-specific data, and generates at least a domain target. Target-setting machine learning model 132 may generate at least a domain target 128a-n as a function of domain-specific data 124a-n. In some embodiments, apparatus 100 may train target-setting machine learning model 132. In some cases, target-setting training data 136 may be input into a machine learning algorithm. Machine learning algorithm may include any machine learning algorithm described in this disclosure, including those referenced in FIGS. 4-7. As used in this disclosure, "target-setting training data" is a dataset that includes a plurality of domain-specific data correlated to a domain target. Domain-specific data and domain targets may be entered into target-setting training data manually, for example by a domain expert. In some cases, domain-specific data and domain targets may be derived for publications associated with a particular domain. Domain-specific data and domain targets may be derived from earlier instances of the apparatus 100 or the system's operation with other groups or with a same group associated with a different domain. Apparatus 100 may train target-setting machine learning model 132 as a function of machine-learning algorithm and/or target-setting training data 136.

With continued reference to FIG. 1, apparatus 100 may generate one or more recommendations 140, for example by using computing device 104. As used in this disclosure, a "group schedule" is a list of planned events with corresponding dates and times for a group. In some cases, apparatus 100 may generate one or more recommendations 140 as a function of one or more of at least a domain target 128a-n and scheduling data 116. In some embodiments, one or more recommendations 140 may include a daily schedule. In some cases, a daily schedule may include events or activities which are intended to help a group progress (and ultimately flourish) within at least a domain 120a-n. In an embodiment, one or more recommendations 136 may be only available to particular members of a group. In another embodiment, one or more recommendations may be available to an entire group. Availability of one or more recommendations 136 may depend on respective schedules of each member of a group. For example, one or more recommendations 136 may include a recommendation that requires Sunday availability, however one member of a group may not be available on Sundays. In response to comparing one or more recommendations 136 to the one member of the group's schedule, the recommendation requiring Sunday availability may not be made available to the one member of the group. In addition, in effort to ensure each member of the group flourishes, an alternative of the recommendation may be made available to the member of the group. In some embodiments, computing device 104 may determine a subset of the one or more recommendations. In some embodiments, the subset of the one or more recommendations have identical expirations. As used in this disclosure, a "daily schedule" is a schedule that spans a day, i.e., 24 hours. In some embodiments, one or more recommendations 140 may include a weekly schedule. As used in this disclosure, a "weekly schedule" is a schedule that spans a week, i.e., seven days. In some embodiments, one or more recommendations 140 may include a monthly schedule. As used in this disclosure, a "monthly schedule" is a schedule that spans a month, i.e., 29, 28, 30, or 31 days. In some cases, a monthly schedule may include events or activities which are intended to help a group progress (and ultimately flourish) within at least a domain 120a-n. In some cases, apparatus 100 may generate one or more recommendations 140 by using a machine learning process, for example a critical domain machine learning model 144. Critical domain machine learning model 144 may including any machine learning process described in this disclosure, including those described with reference to FIGS. 4-7. In some cases, critical domain machine learning model 144 may include a neural network, such as neural networks described in this disclosure, for example with reference to FIGS. 5-6.

Still referring to FIG. 1, in some embodiments, critical domain machine learning model 144 may receive input including one or more of at least a domain target 128a-n and scheduling data 116. As used in this disclosure, a "critical domain machine learning model" is a machine-learning process that that takes as input one or more of at least a domain target and group data, such as scheduling data, and generates at least a domain target. In some embodiments, at least a domain target may be a critical domain. Apparatus 100 may generate one or more recommendations 140 as a function of critical domain machine learning model 144. In some embodiments, apparatus 100 may train critical domain machine learning model 144. In some cases, training critical domain machine learning model 144 may include inputting critical domain training data 148 to a machine learning algorithm. As used in this disclosure, "critical domain training data" is a dataset that includes a plurality of critical domain targets correlated to schedule components. Domain targets and schedule components may be entered into critical domain training data manually, for example by a domain expert. In some cases, critical domain targets and scheduling components may be derived for publications associated with a particular domain. Critical domain targets and scheduling components may be derived from earlier instances of the apparatus 100 or the system's operation with other groups or with a same group associated with a different domain. Machine learning algorithm may include any machine learning algorithm described in this disclosure, for example those described with reference to FIGS. 4-7. As used in this disclosure, a "schedule component" is information that includes event data and temporal data. A schedule component may be included in a schedule. A schedule component may include a location. An exemplary schedule component is "kettle-bell workout, duration of 30 min, located at gym." Apparatus 100 may train critical domain machine learning model 144 as a function of machine-learning algorithm. In some cases, critical domain machine learning model 144 may be a function of one or more automated planning and critical domain algorithms. Additionally, disclosure related to automated planning and critical domain algorithms may be found with reference to FIG. 4.

With continued reference to FIG. 1, apparatus 100 may display one or more of one or more recommendations 140 and at least a domain target 128*a-n* group, for example by way of remote device 108. In some cases, remote device 108 may display to group by way of a graphical group interface (GUI). GUI may be presented to group as part of an application operating upon remote device. GUI may include text and graphics intended to communicate information as well as prompts and interfaces with which group may input information. An exemplary GUI is illustrated in FIG. 3.

Still referring to FIG. 1, in some embodiments, apparatus 100 may interrogate group for update data 152, for example by using remote device. As used in this disclosure, "update data" is information derived or received from group after generation of one or more of at least a group schedule and at least a domain target. In some cases, update data may be useful in determining a group's adherence to a group schedule or progress toward a domain target. In some cases, apparatus 100 may receive update data 152 automatically, for example without knowledge of group. For example, in some cases, update data 152 may be ascertained from data detectable by remote device, e.g., location data, screen time, application time, and the like. In some cases, update data 152 may include objective update data 152. As used in this disclosure, "objective update data" is update data that is objective in quality, for example amount of time a group spent undertaking an event on group schedule. In some cases, update data 152 may include subjective update data 152. As used in this disclosure, "subjective update data" is update data that is subjective in quality, for example how a group rates changes to her social life may be subjective update data relating to a social domain.

Still referring to FIG. 1, in some embodiments, apparatus 100 may evaluate update data 152 as a function of one or more recommendations 140 and/or domain target 128*a-n*, for example using computing device 104. Evaluating update data 152 may yield evaluation results 156. As used in this disclosure, "evaluation results" are information originating from evaluation of update data. In some cases, apparatus 100 may display evaluation results 156 to group, for example by way of remote device 108 and/or a graphical group interface.

Still referring to FIG. 1, in some embodiments, apparatus 100 may evaluate update data 152 using an evaluating machine learning model 160. As used in this disclosure, an "evaluating machine learning model" is a machine learning process that takes update data as input and generate evaluation results. Computing device 104 may input one or more of update data 152 and at least an one or more recommendations 140 to an evaluating machine learning model 160. Computing device 104 may generate evaluation results 156 as a function of evaluating machine learning model 160. In some embodiments, apparatus 100 may train evaluating machine learning model 156 using evaluating training data 164. As used in this disclosure, "evaluating training data" is a dataset that includes a plurality of update data correlated to evaluations. Update data and evaluations may be entered into evaluation training data manually, for example by an evaluation expert. In some cases, update data and evaluations may be derived for publications associated with a particular domain. Update data and evaluations may be derived from earlier instances of the apparatus 100 or the system's operation with other groups or with a same group associated with a different domain. In some cases, evaluating training data may include a plurality of update data and at least a domain correlated to evaluations. In some cases, an evaluation may be representative of an association between a domain status and a domain target. Computing device 104 may input evaluating training data 164 to a machine learning algorithm. Machine learning algorithm may include any machine learning algorithm, for example those disclosed with reference to FIGS. 4-7. Computing device 104 may train evaluating machine learning model 160 as a function of machine-learning algorithm.

Still referring to FIG. 1, in some embodiments, apparatus 100 may notify group. For instance, apparatus 100 may notify group as a function of evaluation results 156. In some cases, apparatus 100 may notify group using remote device 108. Apparatus 100 may notify group by way of an application and/or a graphical group interface running on remote device. Alternatively or additionally, in some cases, remote device 108 may include text messaging capabilities and apparatus 100 may notify group by way of a text message. As used in this disclosure, a "text message" is message communicated by way of one or more of short message service (SMS) and multimedia messaging service (MMS). Still referring to FIG. 1, in some embodiments, apparatus 100 may allow a group to modify a schedule. For example, in some cases, a group schedule 140, which may be auto-generated, is not practical or otherwise acceptable to a group. In this case, a group may submit a schedule change request, for example from remote device 108. As used in this disclosure, a "schedule change request" is information that includes a modification to a group schedule. Computing device 104 may receive at least a schedule change request from group. Computing device 104 may modify at least a group schedule as a function of schedule change request. Exemplary, schedule change requests may include commands to change a time of a schedule component, change a location of a schedule component, change an invite list of a schedule component, change an event/activity of a schedule component, a schedule component, and add a schedule component. In some cases, a schedule change request may include a request to change a prioritization or inclusion of at least a domain 120*a-n*. In some cases, a schedule change request may cause a regeneration of one or more recommendations 140, for example by using one or more machine learning processes (e.g., critical domain machine learning model 144). In some embodiments, notifying a group may include a notification on remote device. As used in this disclosure, a "notification" is an interrupting alarm, for example facilitated by background operation of a graphical group interface. In some cases, a notification may be first authorized by group, for example through use of remote device 'settings.' In some cases, notifications may be disabled to avoid disruption and/or interruption. As used in this disclosure, an "authorized notification" is a notification which has been authorized.

Still referring to FIG. 1, in some cases, apparatus 100 may include a machine learning process configured to identify effective ways to motivate group. In some cases, machine learning process may include a trained machine learning model. In some cases machine learning model may be trained using training data correlating previous outputs (e.g., group schedule, domain targets, and the like) to subsequent updates for groups generally. Alternatively or additionally, in some case, machine learning model may be trained using training data correlating previous outputs to updates for an individual group or a class (i.e., cohort) of similar groups. In some cases, a cohort of groups may be determined by a classifier. Classifier may include any classifier described in this disclosure, for example a clustering algorithm (e.g., K-means clustering algorithm, particle swarm optimization, and the like).

Referring now to FIG. 2, exemplary domains 200 are illustrated by way of a table. As can be seen domains may include vocational 204, marriage 208, family 212, health 216, virtue 220, emotional 224, financial 228, spiritual 232, intellectual 236, lifestyle 240, interest 244, and social 248 to name a few. Each domain 200 may have a status. Exemplary, non-limiting statuses include breakthrough, emerging, growth, plateau, stagnation, and depletion to name a few. In some cases, a domain status may be determined according to one or more state variables. State variable may be affected by objective data and/or subjective data. Exemplary non-limiting examples of objective data include medical measurements, time spent on certain activities, events participated in, number of steps taken, and generally speaking anything that can be measured. In some cases, remote device may directly measure or infer objective data, for example remote device may measure number of steps taken by group, amount of screen time, and the like. Alternatively or additionally objective data may be input by group into remote device. For example, a group may include group weight, group blood pressure, or any other objective datum by way of remote device. In some cases, group may input subjective data, for example by way of remote device. Subjective data may include a numerical representation (e.g., 1-10 rating) of how a group thinks or feels about a current aspect relating to a domain. For example a group may rate a level of anxiety, a level of fulfilment, or the like. In an embodiment, one or more domains may be selected and/or isolated by a group. This may allow for a more focused and concentrated experience on one or more domains of interest to a group. In an embodiment, a group may select one or more domains to isolate and/or focus on. In yet another non-limiting example, computing device 104 may select one or more domains for a group to focus on, using a selection process that may include one or more machine learning processes as described throughout this application.

With continued reference to FIG. 2, at least a domain may include vocational domain 204. Objective data that may be associated with vocational domain includes title, role, responsibility, compensation, and the like. Subjective data may include a rating of group's level of vocational fulfilment. A domain target associated with vocational domain 204 may include a change in a subjective or objective datum associated with the vocational domain 204. Schedule components or events that may be added to exploit value in vocational domain 204 include professional training events, maximizing contribution, exploiting opportunities, and the like.

With continued reference to FIG. 2, at least a domain may include marriage domain 208. Objective data that may be associated with marriage domain includes amount of time spent with spouse, for example time spent enjoying one another. Subjective data may include a rating of group's level of marriage fulfilment. A domain target associated with marriage domain 208 may include a change in a subjective or objective datum associated with the marriage domain 208. Schedule components or events that may be added to exploit value in marriage domain 208 include events determined to maximize marriage fulfilment, including participating in couple centric events, self-sacrificial acts of love, couples therapy, honest communication sessions, and the like.

With continued reference to FIG. 2, at least a domain may include family domain 212. Objective data that may be associated with family domain includes amount of time spent with family. Subjective data may include a rating of group's level of family fulfilment or a rating of a family member's level of fulfilment with group/spouse. A domain target associated with family domain 212 may include a change in a subjective or objective datum associated with the family domain 212. Schedule components or events that may be added to exploit value in family domain 212 include events determined to maximize family fulfilment, including participating in family events, self-sacrificing acts of love, generosity of time, money, and service, and the like.

With continued reference to FIG. 2, at least a domain may include health domain 216. Objective data that may be associated with health domain includes medical data, such as without limitation body mass index, blood pressure, resting heart rate, blood oxygen content, and the like. Subjective data may include a rating of group's level of health fulfilment, a rating of number of activities a group feels are impaired by health concerns, a rating of overall concern with health, and the like. A domain target associated with health domain 216 may include a change in a subjective or objective datum associated with the health domain 216. Schedule components or events that may be added to exploit value in health domain 216 include events determined to maximize health fulfilment, exercise, nutritional meals, visits to medical professionals, and the like.

With continued reference to FIG. 2, at least a domain may include virtue domain 208. Objective data that may be associated with virtue domain includes amount of time acting virtuously, proportion of big decisions which are aligned with desirable virtues, amount of success or failure living within targeted virtue levels, evidence of retained or unretained resolve, and the like. Subjective data may include a rating of group's self-perceived level of virtue or a rating of group's perceived level of virtue from another. A domain target associated with virtue domain 220 may include a change in a subjective or objective datum associated with the virtue domain 220. Schedule components or events that may be added to exploit value in virtue domain 220 include events determined to maximize virtue fulfilment, including participating habit building exercises designed to facilitate consistently good decision making.

With continued reference to FIG. 2, at least a domain may include emotional domain 224. Objective data that may be associated with emotional domain includes amount of time spent in a state of emotional destress, amount of time in emotional harmony, amount of time sleeping, caloric intake, amount of time engaged in anxiety about the past or imagined future, and the like. Subjective data may include a rating of group's level of emotional fulfilment. A domain target associated with emotional domain 224 may include a change in a subjective or objective datum associated with the emotional domain 224. Schedule components or events that may be added to exploit value in emotional domain 224 include therapy, treatment under the supervision of health care professionals, events and exercises that are likely to improve a group's emotions, and the like.

With continued reference to FIG. 2, at least a domain may include financial domain 228. Objective data that may be associated with financial domain includes amount of financial assets possessed by group. Subjective data may include a rating of group's sense of financial security independence and freedom. A domain target associated with financial domain 228 may include a change in a subjective or objective datum associated with the financial domain 228. Schedule components or events that may be added to exploit value in financial domain 228 include meeting with a financial advisor, increasing savings contributions, budgeting, and the like.

With continued reference to FIG. 2, at least a domain may include intellectual domain 236. Objective data that may be associated with intellectual domain includes amount performance in intellectual pursuits, such as graded performance in school. Subjective data may include a rating of group's level of intellectual fulfilment. A domain target associated with intellectual domain 236 may include a change in a subjective or objective datum associated with the intellectual domain 236. Schedule components or events that may be added to exploit value in intellectual domain 236 include events determined to maximize intellectual fulfilment, including enrolling in educational programs, enjoying cultural events, and the like.

With continued reference to FIG. 2, at least a domain may include lifestyle domain 240. Objective data that may be associated with lifestyle domain includes amount of time spent in ideal or unideal lifestyle settings. Subjective data may include a rating of group's level of lifestyle fulfilment. A domain target associated with lifestyle domain 240 may include a change in a subjective or objective datum associated with the lifestyle domain 240. Schedule components or events that may be added to exploit value in lifestyle domain 240 include events determined to maximize lifestyle fulfilment, including housing, travel, wardrobe, toys, activities, groups and free time.

With continued reference to FIG. 2, at least a domain may include interest domain 244. Objective data that may be associated with interest domain includes amount of time on avocational pursuits or personally enjoyable activities. Subjective data may include a rating of group's level of interest fulfilment. A domain target associated with interest domain 244 may include a change in a subjective or objective datum associated with the interest domain 244. Schedule components or events that may be added to exploit value in interest domain 244 include events determined to maximize interest fulfilment, including hobbyist events, and the like.

With continued reference to FIG. 2, at least a domain may include social domain 248. Objective data that may be associated with social domain includes amount of time spent with others in a social setting, for example time spent enjoying one another. Subjective data may include a rating of group's level of social fulfilment. A domain target associated with social domain 248 may include a change in a subjective or objective datum associated with the social domain 248. Schedule components or events that may be added to exploit value in social domain 248 include events determined to maximize social fulfilment, including participating in social events, engaging with a club, friends, groups, entertainment events, and the like.

Referring now to FIG. 3, a flow diagram of a method 300 of personalizing an interactive curriculum for a group is shown. At step 305, method 300 may include querying a database 112 for domain data associated with one or more members of a group. Group data may be received from a remote device by a computing device. In some instances, the group data may include scheduling data, domain-specific data, or both. Group data may be input to remote device via a questionnaire, a series of prompt, an application, a calendar and/or any combination thereof. A group may input group data into a remote device manually, automatically, or both. For example, group may input group data by filling out a questionnaire. Additionally, a group may enable automatic access to the group's calendar such that scheduling data is automatically sent to a computing device.

In some embodiments, group data may be data from at least one member of a group. That is, a computing device may query a database 112 for domain data for data associated with at least one member of the group. In some instances, the domain data may be critical domain data. As described herein, "critical domain" is a domain that is identified as problematic or a domain that a group, or a member of the group may improve in. It should be noted that querying a database 112 for critical domain data may include querying the database 112 for domain scores below a predetermined threshold. In some instances, more than one domain may have a domain score below a predetermined threshold. As such, a computing device may select data associated with a domain with the lowest domain score.

Still referring to FIG. 3, at step 310, method 300 may include extracting a subset of data from the domain data. As discussed herein, a subset of data is critical domain data associated with a group. Although an instance of determining a critical domain is mentioned above with relation to a domain score, determining a critical domain may be determined by various parameters. For example, a critical domain may be determined by an amount of data entries available in a database 112. That is, a domain with the smallest amount of data entries available may be considered a critical domain. As such, a subset of data from domain may be data associated with the smallest amount of data entries available and extracted from a database 112. In another embodiment, a critical domain may be determined by an administrator. A critical domain selected by an administrator may not be problematic but may require some improvement to reach certain goals. As such, a subset of data from domain data may be a critical domain selected by an administrator.

Still referring to FIG. 3, at step 315, method 300 may include training a critical domain machine learning model as a function of the critical domain training data. Training a critical domain machine learning model may include training a critical domain machine learning algorithm with critical domain training data. The critical domain training data correlates historical critical domain data with one or more recommendations that may result in improvement within a critical domain. The critical domain machine learning algorithm may then be used to train the critical domain machine learning model. Once the critical domain machine learning model is trained, critical domain data may be input into the critical domain machine learning model and one or more recommendations may be output. The one or more recommendations may not consider availability of each member of a group but rather be a compilation of one or more general recommendations. In some embodiments, one or more recommendations may be specific to at least a member of a group such that each member of the group may accomplish the one or more recommendations within their own schedules.

Still referring to FIG. 3, at step 320, method 300 may include generating one or more recommendations for the group based at least on an output of the critical domain machine learning model. As mentioned above, one or more recommendations may not consider availability of each member of a group. Thus, it may be desirable to generate of one or more recommendations for each member of a group. It should be noted that each member of a group may have different schedule conflicts so one or more recommendations may be different for each of the members of the group. This advantageously enables each member of a group to improve within a critical domain in accordance with their own availability rather than not completing various recommendations solely because of scheduling conflicts.

In some embodiments, each member of a group is a member of the same department within an enterprise. For example, each member of a group may be a member of an IT department. Keeping that in mind, one or more recommendations may be based at least on a critical domain for the IT department such that each member of the group may be provided with recommendations that are specific to them. Critical domain may be determined by any method described herein.

In another embodiment, each member of a group may be a member of the same enterprise with identical critical domain. For example, each member of the group may be a member that may have a critical domain being marriage 208. However, one member may be from IT, another may be from HR, another from an engineering team, and so forth. With that in mind, one or more recommendations may still be specific to each member of the group but may require additional scheduling considerations since each group member may be in a different department within an enterprise.

Still referring to FIG. 3, at step 325, method 300 may include transmitting the one or more recommendations to one or more remote devices of the one or more members of the group. Transmission may occur over any suitable network including, but not limited to, WiFi, BLUETOOTH, local area network (LAN), a wired network, or the like. It should be noted that transmission of one or more recommendations may be dependent on each member of the group's geographical location. For example, one or more recommendations may be transmitted simultaneously, but a member of a group in Europe may receive the transmission at a different "clock time" than another member of the group in the United States. As described herein, "clock time" is the time as read from a clock associated with respective time zones.

In some embodiments, one or more recommendations may be transmitted as an interactive list (e.g., a checklist) including program logic that automatically updates each member of a group's progress, and the group's progress, upon each member indication the one or more recommendations as complete or incomplete.

Continuing to refer to FIG. 3, at step 330, method 300 may include presenting a graphical representation of the one or more recommendations. One or more recommendations may be presented at a remote device. One or more recommendations may be presented at a remote device via an application, a photo, through a calendar, and/or any combination thereof. A group, or each member of the group may be able to integrate a plurality of lesson included in one or more recommendations into a pre-existing calendar. In some instances, one or more recommendations may be presented on an interactive graphical group interface (GUI) of a remote device such that a group and/or each member of the group may input one or more indications of completion, incompletion, or both.

Figure 4:
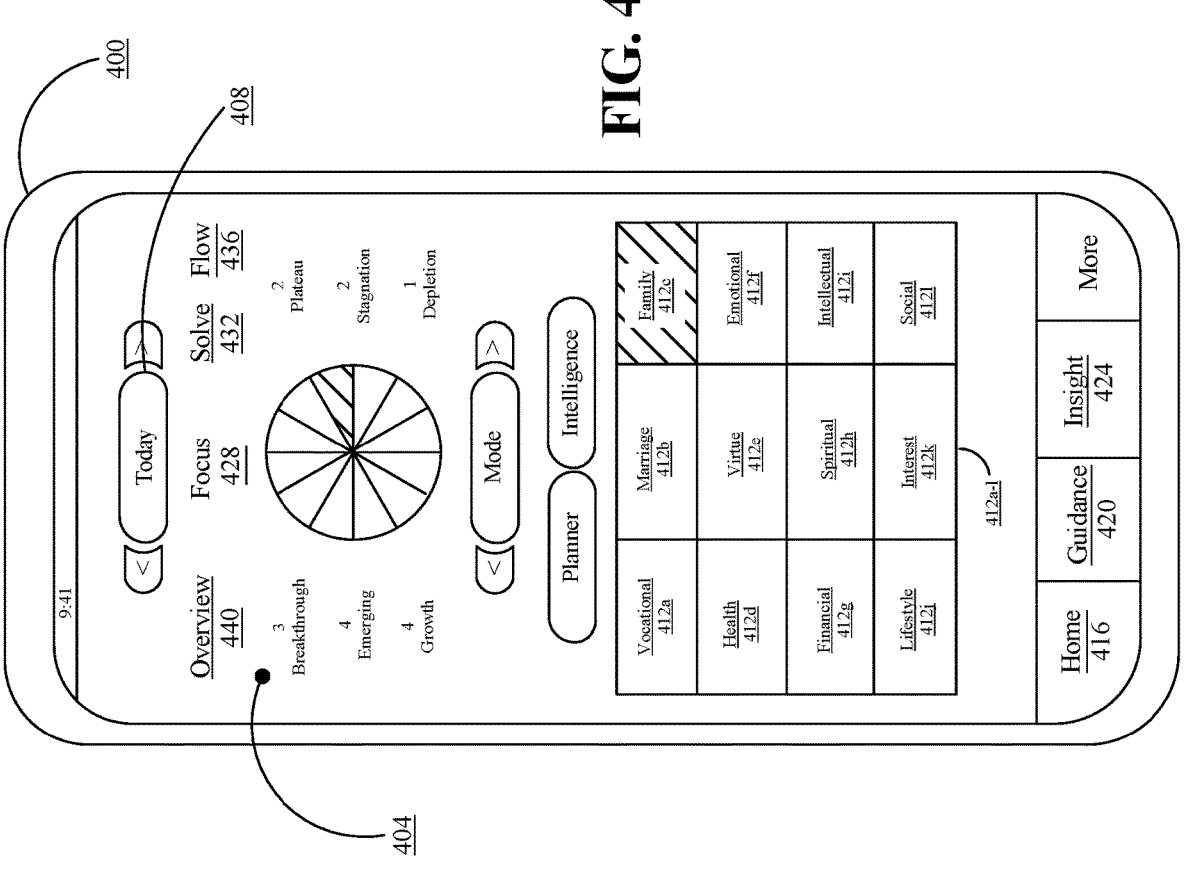
FIG. 4 is an exemplary remote device including an exemplary graphical user interface of a remote device.

Referring now to FIG. 4, an exemplary embodiment of a remote device 400 is illustrated. In some cases, remote device 400 may interface with user by way of a graphical user interface (GUI) 404. In some cases, remote device 400 may display to user a schedule 408, such as without limitation a weekly schedule. In some cases, schedule 408 function allows a user to view and edit a user schedule. In some embodiments, schedule 408 may be an optimal user schedule generated using a computing device, such as, for example, optimal user schedule 136 and computing device 104 discussed with reference to FIG. 1. In some cases, remote device 400 may display to user domains 412a-1. In some cases, progress (e.g., evaluation results) related to a domain may be represented by GUI, such as by way of color coding. For example, family domain 412c is indicated with hashmarks to indicate that family is an undesirable (e.g., depleted) status. In some cases, a status for each domain may be indicated to user by way of GUI 404, for example in an " " view 416. In some cases, GUI may allow user access to resources. In some cases, resources may be domain specific. Exemplary resources include guidance 420 and insight 424. Guidance 420 may include any audio information designed to enrich a user, for example within a specific domain. Insight 424 may include any media, such as video, text, and the like intended to enrich a user, for example within a specific domain. Focus 428 may isolate one or more domains that may aid in a more focused and concentrated experience to assist in driving change and progress. Solve 432 may include a scheduled focus for a particular period of time such as a day, week, month, quarter, year, and the like. Solve 432 may display information pertaining to particular issues and problems to solve and may aid in selecting one or more breakthrough domains. Flow 436 may include habits, projects, rocks and to-dos that may be aligned with a user's priorities and interests. Overview 440 may include a big picture view of domains, realms, and/or categories. Notebook 444 and/or intelligence 448 may include one or more digital copies of handwritten tools that may be integrated and automatically updated and available within graphical user interface 404.

In some embodiments, GUI 404 may enable a user to interact with specific resources of a domain. For example, when a user interacts with home 416, GUI 404 may illuminate domains 412a-1 with different colors based at least on a status of each domain. Additionally, one or more domains may be considered as an undesirable status (e.g., depleted). As described in the above example, FIG. 4 illustrates family domain 412c being depleted. In some embodiments, display box for family domain 412c may be pulsating. That is, display box for family domain 412c may appear to rise and fall into the plane of GUI 404. This may draw a user's attention to family domain 412c. The pulsating feature may be especially beneficial for users with sight problems such as color blindness. In some embodiments, display box for family domain 412c may be interacted with and maximized to a full screen mode. While in full screen, a plurality of lessons and their respective completion statuses may be displayed. It should be noted that the full screen capability may be available upon interacting with any domain display box and is not limited to undesirable status domains. In some embodiments, full screen mode may be an automatic response to a user interacting with home 416. For example, a user may interact with home 416 and in response to the user's interaction, a full screen mode of one or more undesirable status domains, with their respective plurality of lessons and completion statuses, will be displayed.

Figure 5:
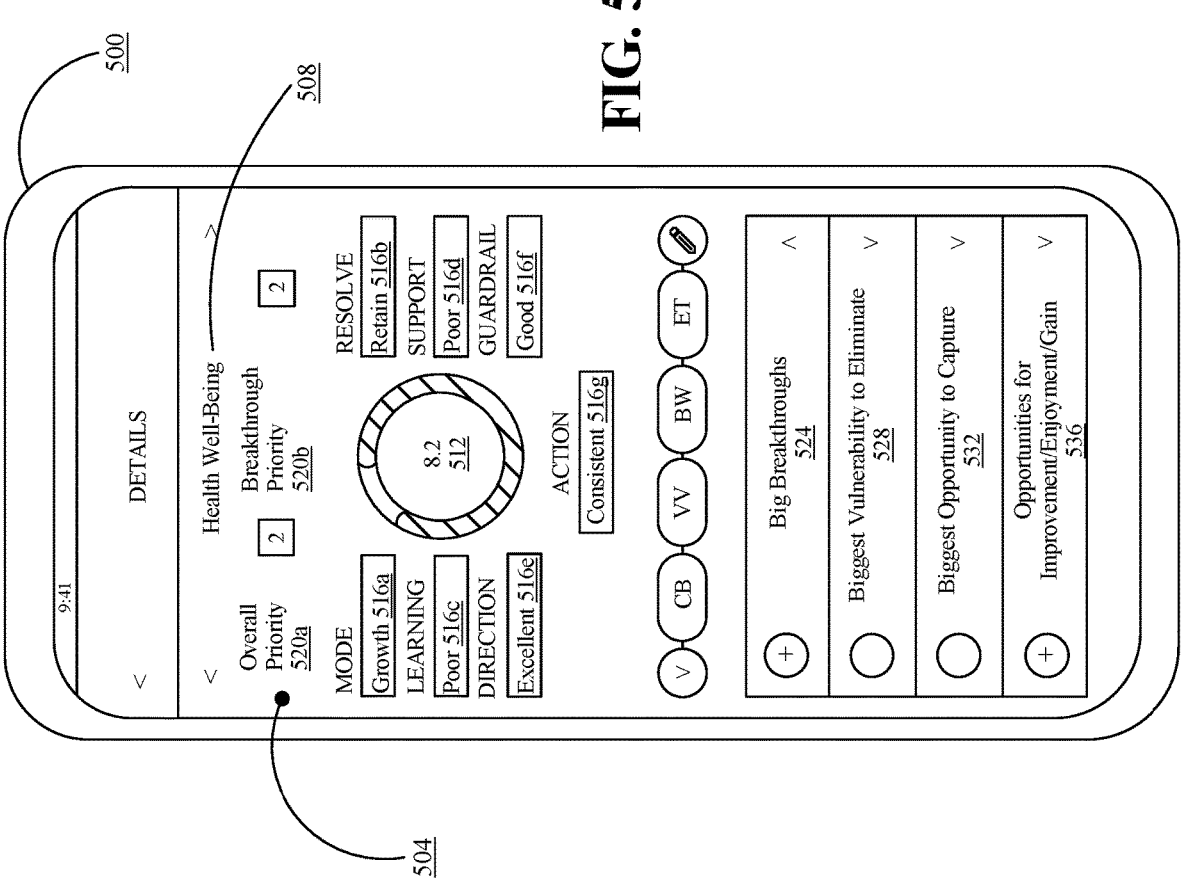
FIG. 5 is an exemplary remote device including an exemplary graphical user interface of a remote device.

Referring now to FIG. 5, an exemplary remote device 500 is illustrated. In some cases, remote device 500 may interface with group by way of a graphical group interface (GUI) 504. In some cases, remote device 500 may display domain-specific information 508, for instance information related to health domain. In some cases, an overall domain-specific rating 512 (i.e., evaluation result) may be presented to group. Additionally, subordinate domain-specific ratings (i.e., evaluation results) 516a-g may be presented to group. For example, subordinate domain-specific ratings may be related to mode 516a, resolve 516b, learning 516c, support 516d, direction 516e, guardrail 516f, action 516g, and the like. In some cases, a domain may be prioritized, for example with an overall priority 520a and/or a breakthrough priority 520b. In some cases, domain-specific information may be enumerated and/or prioritized. Exemplary enumerations and/or prioritizations include without limitation big breakthroughs 524, biggest vulnerability to eliminate 528, biggest opportunity to capture 532, opportunities for improvement/enjoyment/gain 536, and the like.

Figure 6:
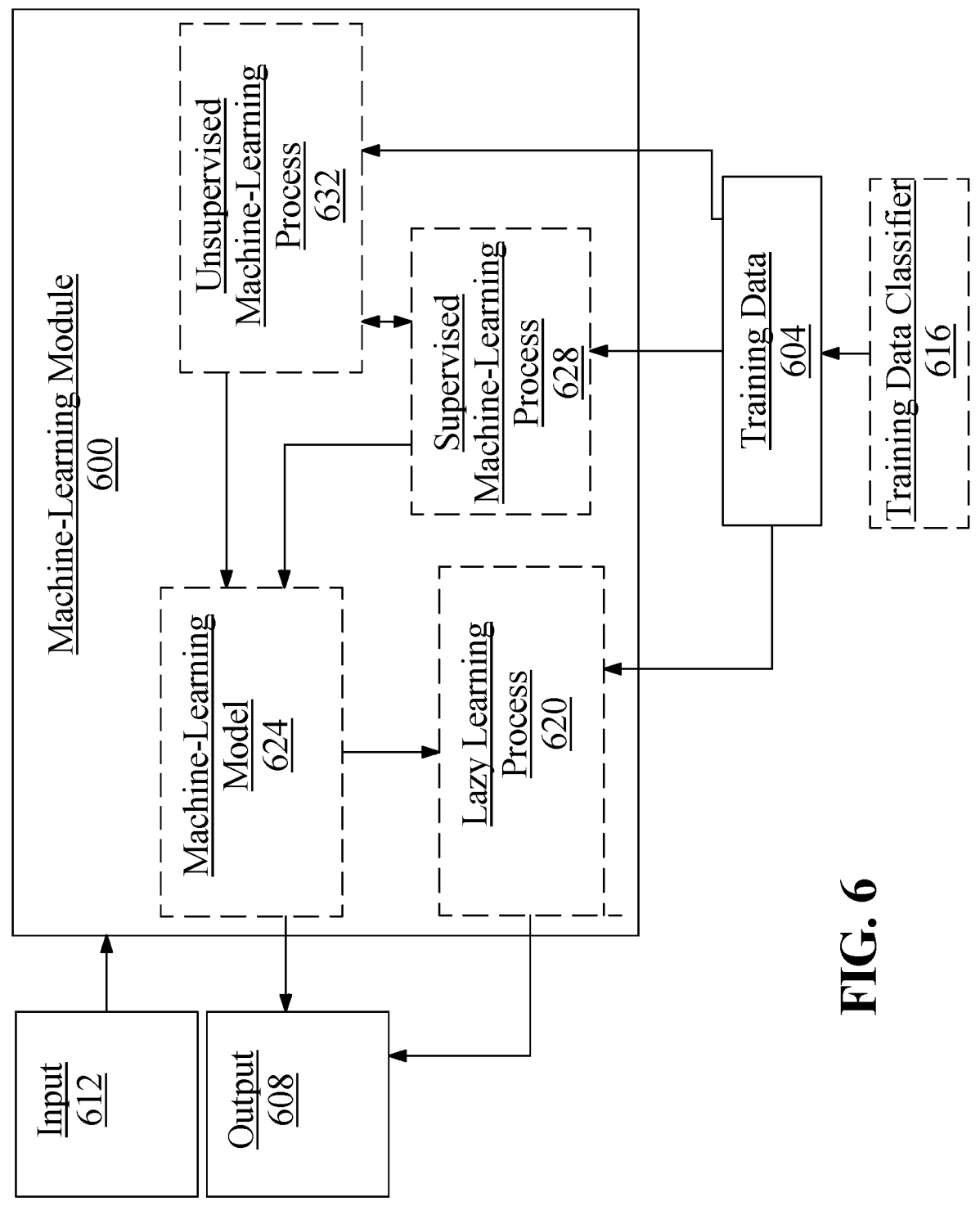
FIG. 6 is a block diagram illustrating exemplary machine learning processes.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a group and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example inputs may include domain-specific data and outputs may include correlated domain targets. Alternatively or additionally, inputs may include scheduling data and at least a domain target correlated to outputs that include schedule components or group schedules. Alternatively or additionally, inputs may include update data and/or domains correlated to evaluations.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to a particular domain, group, or group cohort. For example, in some cases, any machine-learning model described herein may be trained and/or retrained specifically with training data that is representative only of a particular domain, a particular group, or a cohort.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described above as inputs, outputs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 6, in some embodiments, machine-learning module 600 may be configured to perform automated planning and scheduling. In some cases, automated planning may require iterative processes, allowing feedback (e.g., group input, such as a scheduling change request) to affect planning. In some cases, a planner 600 may input a domain model (a description of a set of possible actions which model the domain) for a single domain as well as a specific problem to be solved specified by, for instance, by an initial state and a goal (e.g., domain target), in contrast to those in which there is no input domain or multiple input domains are specified. Such planners may be called domain independent, as they can solve planning problems from a wide range of domains. Typical examples of domains are described above in reference to FIG. 2. Hence a single domain-independent planner 600 can be used to solve planning problems in all domains and thereby generate a group schedule. In some cases, a maximum number of domains may be constrained by increased complexity in scheduling or planning. In some cases, status within at least a domain may be represented by one or more state variables. Each possible status of at least a domain may be represented by an assignment of values to state variables, and scheduled events (e.g., actions) may determine how the values of the state variables change when that planned schedule event occurs. As a set of state variables induce a state space that has a size that may grow exponentially, planning, and number of maximum number of domains may be constrained to avoid runaway complexity (e.g., dimensional complexity and combinatorial complexity). A number of algorithms and approaches may be used for automated planning.

With continued reference to FIG. 6, exemplary non-limiting approaches for planning include classical planning, reduction to other problems, temporal planning, probabilistic planning, preference-based planning, conditional planning (e.g., contingent planning and conformant planning), and the like. In some cases, classical planning may include a known initial state, deterministic events, non-simultaneous events, and events that are singularly attended to by group. A deterministic event may be expected to change a status (i.e., state variable) of a domain in a predictable way. In some cases, classical planning may include forward chaining state space search, backward chaining search, and partial-order planning. classical planning approaches may be, in some cases, enhanced and/or simplified with heuristics, state constraints, and the like.

With continued reference to FIG. 6, an automated planning algorithm may include a reduction to other problems. In some cases, a reduction to other problems may include reducing planning to a satisfiability problem (e.g., Boolean satisfiability problem). This may be referred to as Planning as Satisfiability (satplan). Exemplary non-limiting satplan algorithms include Davis-Putnam-Logemann-Loveland (DPLL) algorithm, GSAT, and WalkSAT. In some cases, reduction to other problems may include reduction to model checking. Model checking reduction to other problems may include traversing at least a state space and checking to ensure correctness against a given specification.

With continued reference to FIG. 6, an automated planning algorithm may include a temporal planning approach. In some cases, temporal planning can be solved with methods similar to classical planning. Temporal planning may additionally account for a possibility of temporally overlapping events or actions with a duration being taken concurrently. As a result, temporal planning algorithms may define a state to include information about a current absolute time and for how long each event has proceeded. Temporal planning may schedule plans relative rational or real time, or with integer time.

With continued reference to FIG. 6, an automated planning algorithm may include a probabilistic planning approach. Exemplary non-limiting methods of probabilistic planning may include Markov decision processes and/or partially observable Markov decision processes. In some case, probabilistic planning can be solved with iterative methods such as value iteration and policy iteration, for example when state space is sufficiently small. With partial observability, probabilistic planning may be similarly solved with iterative methods, but using a representation of value functions defined for space of beliefs instead of states.

With continued reference to FIG. 6, an automated planning algorithm may include preference-based planning. In preference-based planning, a schedule may be generated that satisfies group-specified preferences. For example, in some cases, a group may input preferences, such as a prioritization of one domain over another, a preference to have certain events at certain times, a preference for certain events to occur on different days, and the like. In some cases, a preference may have a numerical value. In which cases, a Markov Decision Processes (MDP) may be used (i.e., reward-based planning). Alternatively or additionally, in some cases, a group preference may not have a precise numerical value.

With continued reference to FIG. 6, an automated planning algorithm may include conditional planning. In some cases, conditional planning may include hierarchical planning, which may be compared with an automatic generated behavior tree. A normal behavior tree may allow for loops or if-then-statements. Conditional planning may overcome this and allow for these conditions within the automated planning process. In some cases, a planner 600 may synthesize a program, which may then be run in order to generate group schedule. Exemplary non-limiting conditional planner includes "Warplan-C." In some cases, conditional planning may allow for uncertainties during schedule generation. The schedule may then include different contingent events depending upon certain occurrences, such as without limitation group data, update data, and/or evaluation results. In some cases, a conditional planned 600 may generate partial plans or schedule components. In this cases, a conditional planner may determine what chunks or schedule components a schedule may be comprised of without forcing a complete plan or schedule of everything from start to finish. In some cases, this approach may help to reduce state space and solve much more complex problems, perhaps allowing for more domains to be considered during scheduling.

With continued reference to FIG. 6, in some cases conditional planning may include contingent planning. Contingent planning may be used when a group's status within a domain (i.e., domain status) may be observable by way of group data and/or update data. As group data and/or update data may provide only an incomplete or imperfect representation of domain status, planner may act incomplete information. For a contingent planning problem, a schedule may no longer be a sequence of events but a decision tree, as each step of the schedule may be represented by a set of states rather than a single perfectly observable state. Contingent planning may also be used when an effect an event will have on a domain state is not knowable a priori and is thus indeterminable. A selected event therefore may depend on state of domains or group. For example, if event fits schedule for Tuesday afternoon, then event will be Tuesday afternoon, otherwise event may be Thursday morning. A particular case of contiguous planning may be represented by fully-observable and non-deterministic (FOND) problems.

With continued reference to FIG. 6, in some cases, conditional planning may include conformant planning. Conformant planning may be employed when planner 600 is uncertain about state of domain or group and cannot make any observations. For example, between periods of update data. In this cases, planner 600 is unable to verify beliefs about group's status, for instance within at least a domain. In some cases, conformant planning may proceed similar to methods for classical planning. Exemplary non-limiting computer languages for planning include Stanford Research Institute Problem Solver (STRIPS), graphplan, Planning Domain Definition Language (PDDL), and Action Description Language (ADL). An alternative language for describing planning problems may include hierarchical task networks, in which a set of tasks may be given. In some cases, each task can be either realized by a primitive action or event or decomposed into a set of other tasks. In some cases, a hierarchical task network may not involve state variables, although in some cases state variables may be used and may simplify description of task networks.

Figure 7:
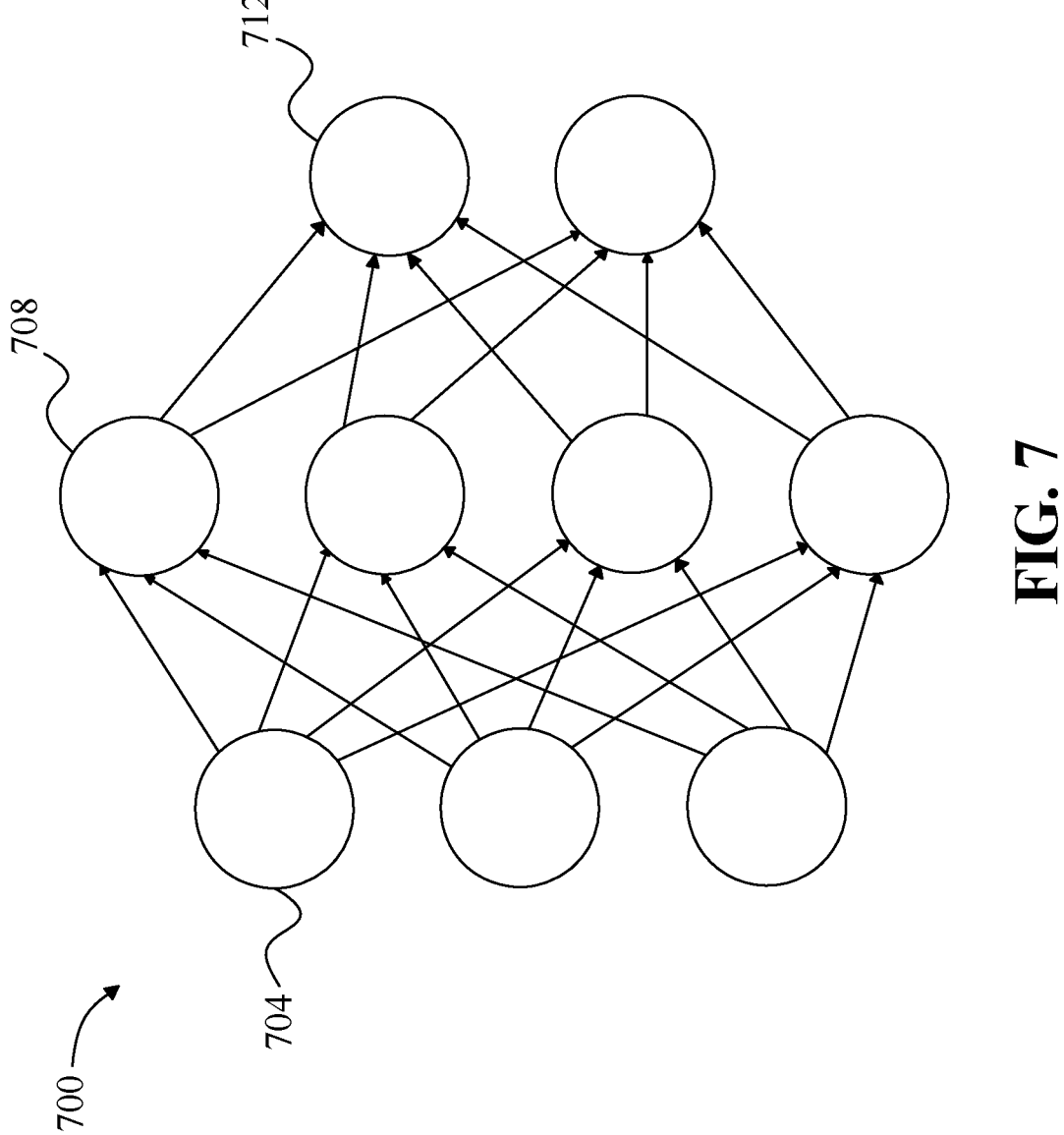
FIG. 7 is a block diagram illustrating an exemplary nodal network.

Referring now to FIG. 7, an exemplary embodiment of neural network 700, for example a feed-forward network, is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 8:
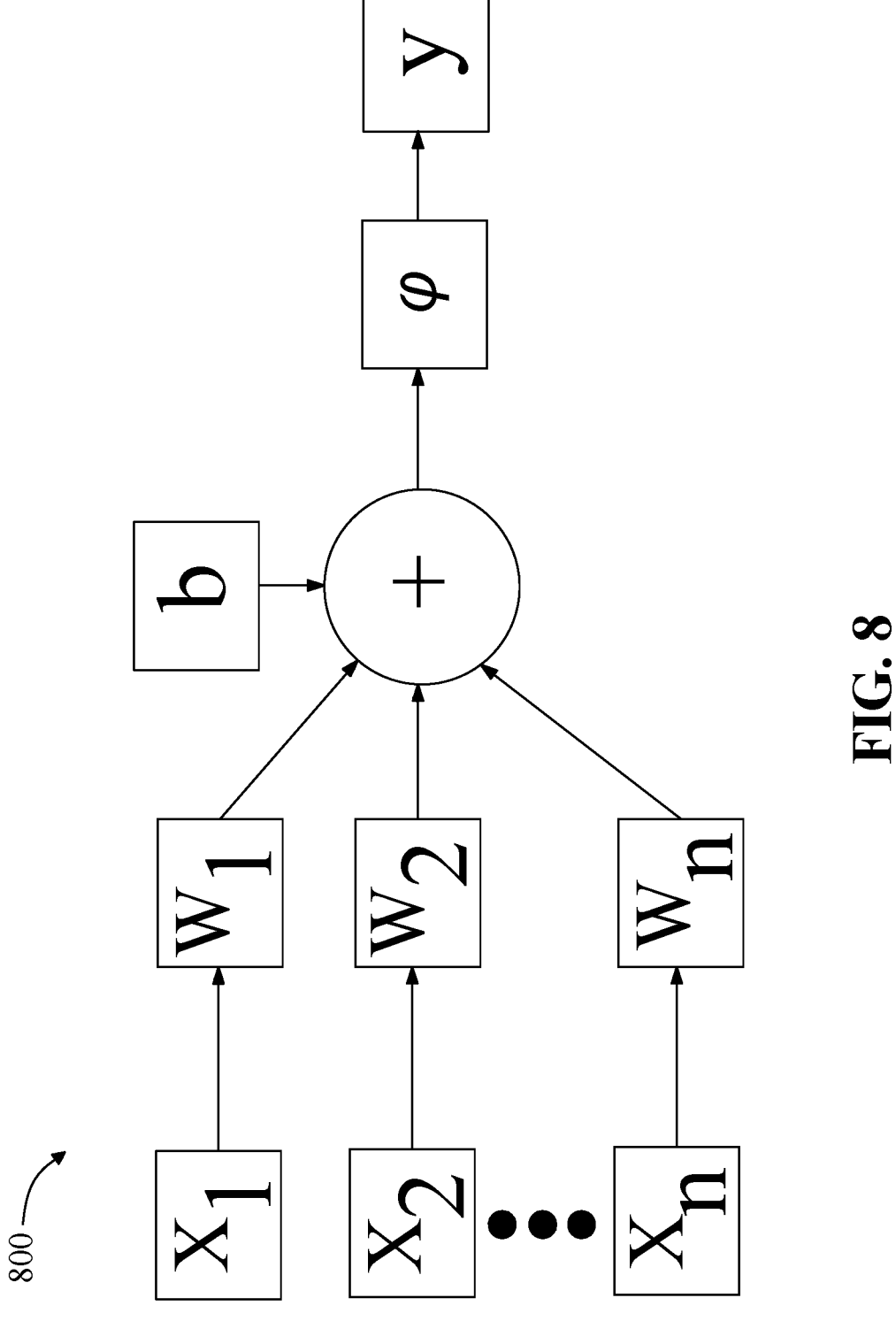
FIG. 8 is a block diagram illustrating an exemplary node.

Referring now to FIG. 8, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring again to FIG. 1, In some embodiments, computing device 104 may be configured to modify a training set in response to group data, update data, and/or a scheduling change request. For example, computing device 104 may, in some cases, retrain a machine-learning model, for instance target-setting machine learning model 132, scheduling machine-learning model 144, and/or evaluating machine-learning model 160. In some embodiments, computing device 104 may be configured to classify at least domain target 128*a-n* and determine a confidence metric. For example, in some exemplary embodiments confidence metric may be a floating-point number within a prescribed range, such as without limitation 0 to 1, with each end of the prescribed range representing an extreme representation, such as without limitation substantially no confidence and substantially absolute confidence, respectively. In some cases, confidence metric may represent a relationship between a result of filtering and/or classifying at least a domain target 128*a-n*. Confidence metric may be determined by one more comparisons algorithms, such as without limitation a fuzzy set comparison. For example, in some exemplary embodiments a fuzzy set comparison may be employed to compare domain specific data 124*a-n* with a membership function derived to represent at least a domain target 128*a-n* for classification.

Figure 9:
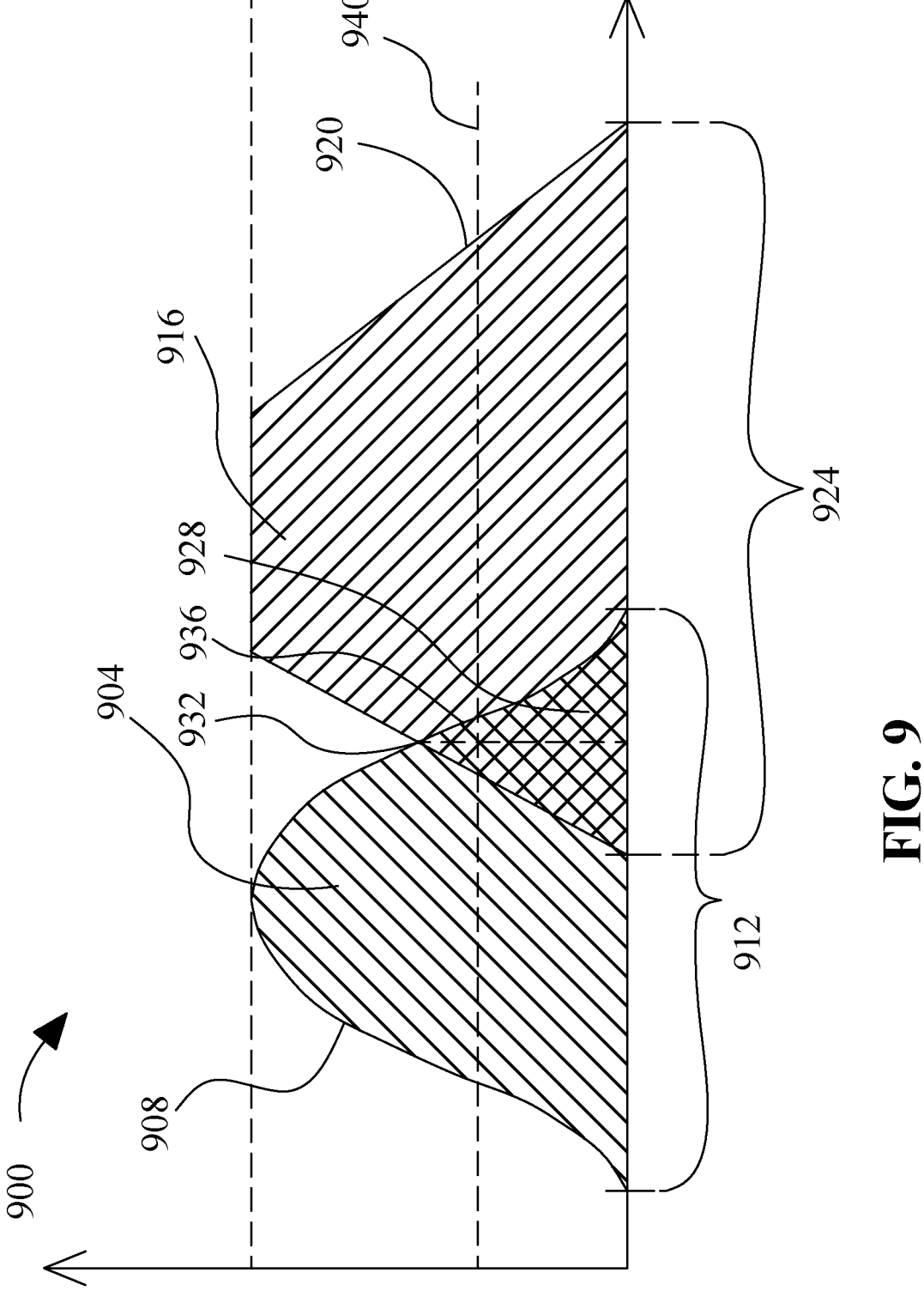
FIG. 9 is a block diagram illustrating exemplary fuzzy sets.

Referring to FIG. 9, an exemplary embodiment of fuzzy set comparison 900 is illustrated. A first fuzzy set 904 may be represented, without limitation, according to a first membership function 908 representing a probability that an input falling on a first range of values 912 is a member of the first fuzzy set 904, where the first membership function 908 has values on a range of probabilities such as without limitation the interval [0,1], and an area beneath the first membership function 908 may represent a set of values within first fuzzy set 904. Although first range of values 912 is illustrated for clarity in this exemplary depiction as a range on a single number line or axis, first range of values 912 may be defined on two or more dimensions, representing, for instance, a Cartesian product between a plurality of ranges, curves, axes, spaces, dimensions, or the like. First membership function 908 may include any suitable function mapping first range 912 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \dfrac{x-a}{b-a}, & \text{for } a \le x < b \\ \dfrac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 9, first fuzzy set 904 may represent any value or combination of values as described above, including output from one or more machine-learning models and group data from remote device 108, a predetermined class, such as without limitation a domain status and/or a domain target. A second fuzzy set 916, which may represent any value which may be represented by first fuzzy set 904, may be defined by a second membership function 920 on a second range 924; second range 924 may be identical and/or overlap with first range 912 and/or may be combined with first range via Cartesian product or the like to generate a mapping permitting evaluation overlap of first fuzzy set 904 and second fuzzy set 916. Where first fuzzy set 904 and second fuzzy set 916 have a region 928 that overlaps, first membership function 908 and second membership function 920 may intersect at a point 932 representing a probability, as defined on probability interval, of a match between first fuzzy set 904 and second fuzzy set 916. Alternatively or additionally, a single value of first and/or second fuzzy set may be located at a locus 936 on first range 912 and/or second range 924, where a probability of membership may be taken by evaluation of first membership function 908 and/or second membership function 920 at that range point. A probability at 928 and/or 932 may be compared to a threshold 940 to determine whether a positive match is indicated. Threshold 940 may, in a non-limiting example, represent a degree of match between first fuzzy set 904 and second fuzzy set 916, and/or single values therein with each other or with either set, which is sufficient for purposes of the matching process; for instance, threshold may indicate a sufficient degree of overlap between an output from one or more machine-learning models and/or group data from remote device 108 and a predetermined class, such as without limitation a domain status and/or domain target, for combination to occur as described above. Alternatively or additionally, each threshold may be tuned by a machine-learning and/or statistical process, for instance and without limitation as described in further detail below.

Further referring to FIG. 9, in an embodiment, a degree of match between fuzzy sets may be used to classify. For instance, if a domain-specific data has a fuzzy set matching a domain target fuzzy set by having a degree of overlap exceeding a threshold, computing device 104 may classify the domain-specific data as belonging to the domain target. Where multiple fuzzy matches are performed, degrees of match for each respective fuzzy set may be computed and aggregated through, for instance, addition, averaging, or the like, to determine an overall degree of match.

It is to be noted that any one or more of the aspects and embodiments described herein may be conveniently implemented using one or more machines (e.g., one or more computing devices that are utilized as a group computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
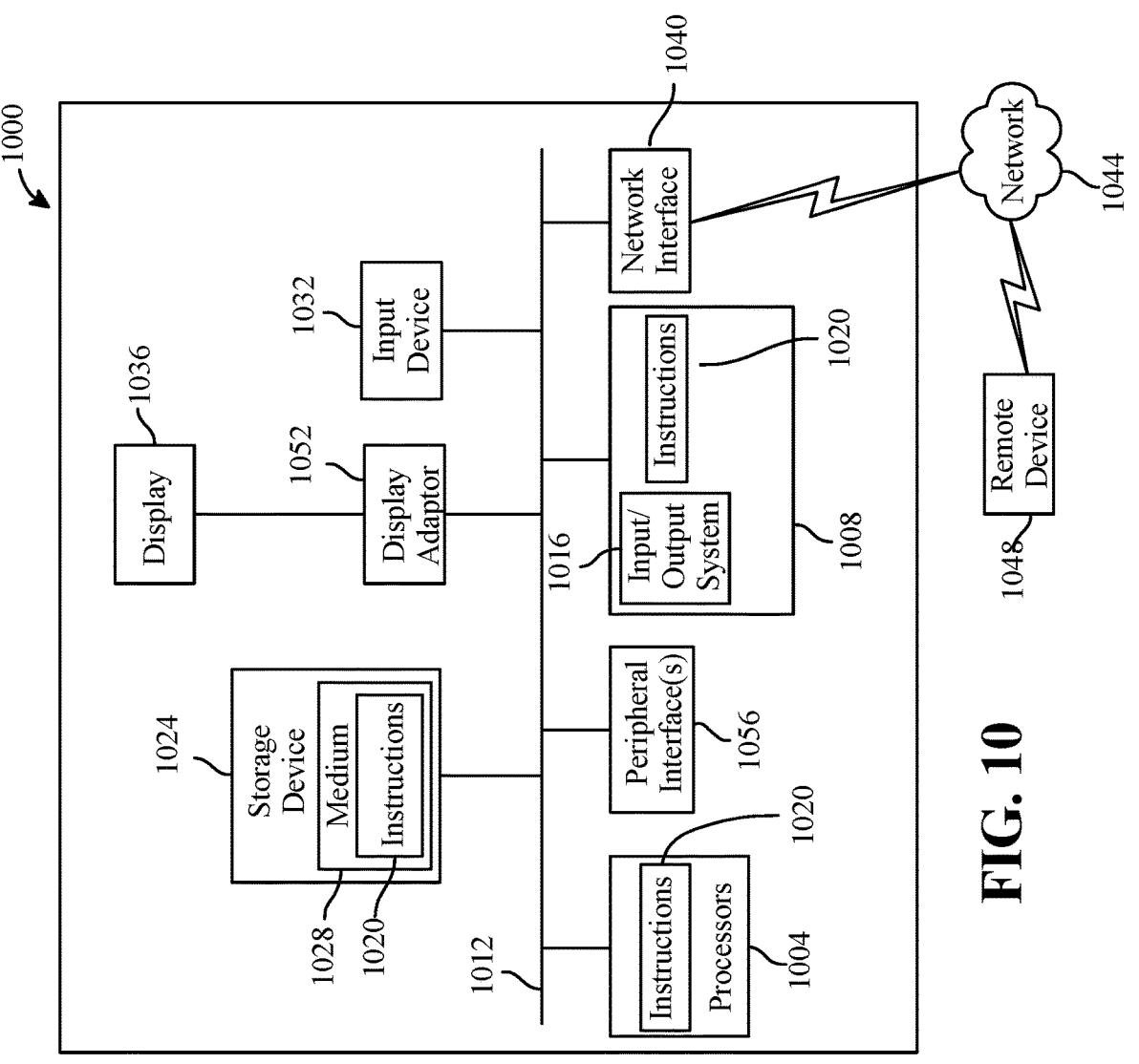
FIG. 10 is a block diagram of a computing apparatus that can be used to implement any one or more of the methodologies disclosed herein and any one or more portions thereof.

FIG. 10 shows a diagrammatic representation of one embodiment of a computing device in the exemplary form of a computer apparatus 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer apparatus 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer apparatus 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer apparatus 1000 (e.g., via an external port connector (not shown)). Particularly, storage device 1024 and an associated machine-readable medium 928 may provide nonvolatile and/or volatile storage of machine-readable instructions, data structures, program modules, and/or other data for computer apparatus 1000. In one example, software 1020 may reside, completely or partially, within machine-readable medium 1028. In another example, software 1020 may reside, completely or partially, within processor 1004.

Computer apparatus 1000 may also include an input device 1032. In one example, a group of computer apparatus 1000 may enter commands and/or other information into computer system 900 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a group selection device for selecting one or more graphical representations in a graphical interface as described above.

A group may also input commands and/or other information to computer apparatus 1000 via storage device 1024 (e.g., a removable disk drive, a flash drive, etc.) and/or network interface device 1040. A network interface device, such as network interface device 1040, may be utilized for connecting computer apparatus 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer apparatus 1000 via network interface device 1040.

Computer apparatus 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer apparatus 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

Figure 11:
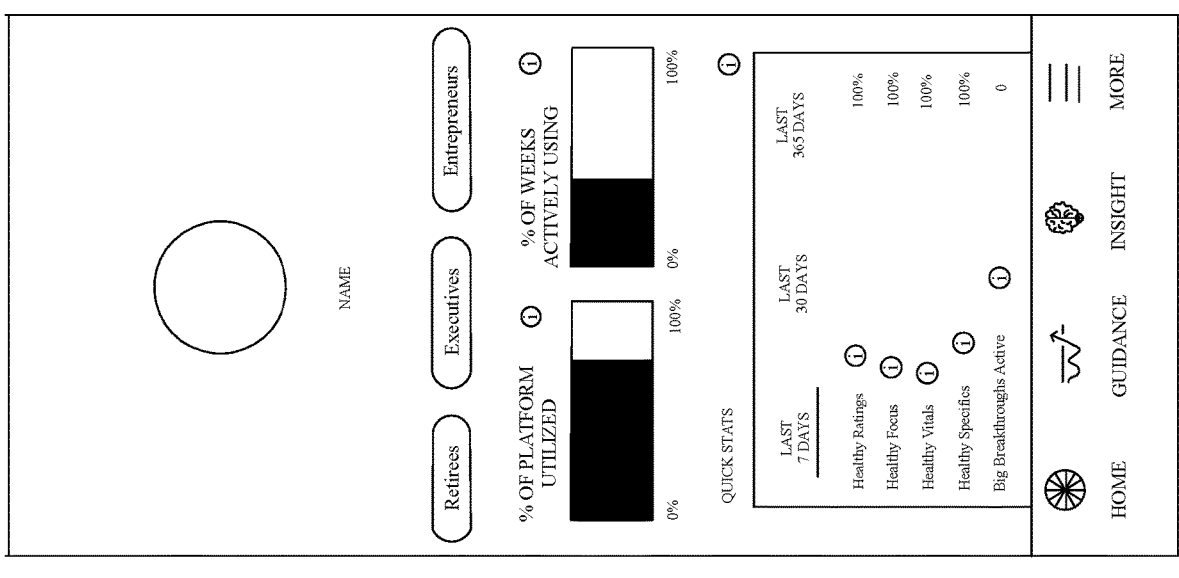
FIG. 11 is an exemplary remote device including an exemplary graphical user interface of a remote device.

Referring now to FIG. 11, an exemplary remote device is illustrated. In some cases, remote device may interface with group by way of a graphical group interface (GUI) 1100.

Figure 12A:
FIG. 12A is an exemplary remote device including an exemplary graphical user interface of a remote device.
Figure 12B:
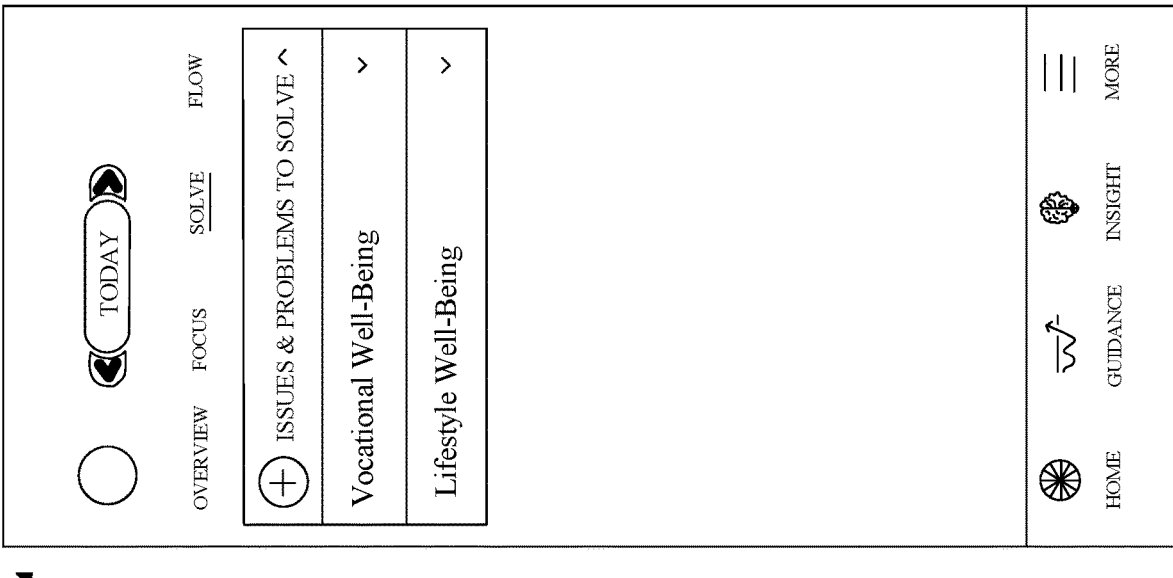
FIG. 12B is an exemplary remote device including an exemplary graphical user interface of a remote device.

Referring now to FIGS. 12A and 12B, an exemplary remote device display is illustrated. In some instances, remote device may interface with user by way of a graphical user interface (GUI) 1200. In some cases, remote device may display suggestions such as "Habits/Productivity hacks," "Rocks," "Issues & Problems to Solve," or the like. Each suggestion category may include at least a domain with a respective drop-down menu option. In some instances, at least a domain may be color coded to indicate a domain-specific rating. As a non-limiting example, at least a domain may be a green shade if a respective domain-specific rating is above a certain threshold (e.g., 7.1). Further, at least a domain may be a yellow shade if a respective domain-specific rating is below a certain threshold (e.g., 7.0).

Continuing to refer to FIGS. 12A and 12B, at least a domain drop-down menu may include one or more recommendations and/or one or more suggestions associated with the suggestion category and the at least a domain. As a non-limiting example, a drop-down menu for "Vocational Well-Being" under the "Habits/Productivity Hacks" suggestion category may include habits and/or productivity hacks to improve a user's vocational well-being. Continuing the non-limiting example, habits and/or productivity hacks to improve the user's vocational well-being may include organizational suggestions, suggested modification to hours, prioritizing the user's work tasks based on predetermined importance, or the like.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of optimizing value within certain domains, the method comprising:

providing, at a computing device, domain data associated with one or more members of a group, wherein the domain data is associated with a plurality of domains;

extracting, by the computing device, a subset of data from the domain data, wherein the subset of data comprises critical domain target data including scheduling data;

generating, by the computing device, a training data classifier as a function of unfiltered training data using a classification algorithm;

filtering, by the computing device, elements of the unfiltered training data using the training data classifier to generate a plurality of critical domain training data sets each containing a plurality of data entries correlating a plurality of critical domain targets including a plurality of scheduling components to a plurality of recommendations associated with a plurality of categories of groups;

selecting, by the computing device, at least one filtered critical domain training data set of the plurality of critical domain training data sets as a function of the group using the training data classifier;

training, by the computing device, a critical domain machine learning model as a function of the at least one filtered critical domain training data set, wherein:

the critical domain machine learning model comprises an artificial neural network (ANN);

the ANN comprises an input layer of nodes, one or more intermediate layers of nodes and an output layer of nodes; and training the critical domain machine learning model comprises training the ANN by:

applying the plurality of critical domain targets including the plurality of scheduling components of the at least one filtered critical domain training data set to the input layer of nodes of the ANN;

adjusting connections and weights between nodes in adjacent layers of the ANN to produce outputs of recommendations at the output layer of nodes;

receiving a scheduling change request associated with the one or more members of the group;

modifying the at least one filtered critical domain training data set in response to the scheduling change request to create at least one modified filtered critical domain training data set; and retraining the ANN as a function of the at least one modified filtered critical domain training data set;

generating, by the computing device, one or more recommendations for the group based on the critical domain target data including the scheduling data using the retrained ANN; and presenting, by one or more remote devices communicatively connected to the computing device, a graphical representation of the one or more recommendations in a graphical user interface of the one or more remote devices, wherein presenting the graphical representation comprises:

switching, by the graphical user interface, between a plurality of views upon user selection of display elements corresponding to each view of the plurality of views, wherein the plurality of views includes at least a first view and a second view;

displaying, by the graphical user interface, a first plurality of display elements in the first view, wherein the first plurality of display elements includes a display element for each domain of the plurality of domains; and displaying, by the graphical user interface, a second plurality of display elements in the second view, wherein the second plurality of domain elements excludes at least one display element of the first plurality of display elements.

2. The method of claim 1, wherein each domain of the plurality of domains has a domain status, and the graphical user interface is further configured to display each display element of the first plurality of display elements with a color indicating a status of a corresponding domain.

3. The method of claim 1, wherein a domain of the plurality of domains is a depleted domain, and the graphical user interface is configured to cause a display element of the first plurality of display elements that corresponds to the depleted domain to pulsate.

4. The method of claim 1, wherein a domain of the plurality of domains is a depleted domain, and the graphical user interface is configured to cause a display element of the first plurality of display elements that corresponds to the depleted domain to fill an entire view screen of the graphical user interface.

5. The method of claim 1, wherein the graphical user interface is configured to:

receive a user interaction with a display element of the plurality of display elements; and cause the display element to fill an entire view screen of the graphical user interface.

6. The method of claim 1, wherein the members of the group are within a same department.

7. The method of claim 1, further comprising selecting members of the group based at least on one critical domain.

8. The method of claim 1, wherein extracting the critical domain data further comprises extracting the critical domain data using natural language processing.

9. The method of claim 1, wherein generating the one or more recommendations comprises generating the one or more recommendations for each member of the group.

10. The method of claim 1, wherein the one or more recommendations for the group are available for an entirety of the group.

11. An apparatus for optimizing value within certain domains, the apparatus comprising:

a memory storing instructions;

one or more processors, the one or more processors configured to execute the instructions stored in the memory, the instructions, when executed, cause the one or more processors to perform operations, the operations comprising:

providing, at a computing device, domain data associated with one or more members of a group, wherein the domain data is associated with a plurality of domains;

extracting, by the computing device, a subset of data from the domain data, wherein the subset of data comprises critical domain target data including scheduling data;

generating, by the computing device, a training data classifier as a function of unfiltered training data using a classification algorithm;

filtering, by the computing device, elements of the unfiltered training data using the training data classifier to generate a plurality of critical domain training data sets each containing a plurality of data entries correlating a plurality of critical domain targets including a plurality of scheduling components to a plurality of recommendations associated with a plurality of categories of groups;

selecting, by the computing device, at least one filtered critical domain training data set of the plurality of critical domain training data sets as a function of the group using the training data classifier;

training, by the computing device, a critical domain machine learning model as a function of the at least one filtered critical domain training data set, wherein:

the critical domain machine learning model comprises an artificial neural network (ANN);

the ANN comprises an input layer of nodes, one or more intermediate layers of nodes and an output layer of nodes; and training the critical domain machine learning model comprises training the ANN by:

applying the plurality of critical domain targets including the plurality of scheduling components of the at least one filtered critical domain training data set to the input layer of nodes of the ANN;

adjusting connections and weights between nodes in adjacent layers of the ANN to produce outputs of recommendations at the output layer of nodes;

receiving a scheduling change request associated with the one or more members of the group;

modifying the at least one filtered critical domain training data set in response to the scheduling change request to create at least one modified filtered critical domain training data set; and retraining the ANN as a function of the at least one modified filtered critical domain training data set;

generating, by the computing device, one or more recommendations for the group based on the critical domain target data including the scheduling data using the retrained ANN; and presenting, by one or more remote devices communicatively connected to the computing device, a graphical representation of the one or more recommendations in a graphical user interface of the one or more remote devices, wherein presenting the graphical representation comprises:

switching, by the graphical user interface, between a plurality of views upon user selection of display elements corresponding to each view of the plurality of views, wherein the plurality of views includes at least a first view and a second view;

displaying, by the graphical user interface, a first plurality of display elements in the first view, wherein the first plurality of display elements includes a display element for each domain of the plurality of domains; and displaying, by the graphical user interface, a second plurality of display elements in the second view, wherein the second plurality of domain elements excludes at least one display element of the first plurality of display elements.

12. The apparatus of claim 11, wherein each domain of the plurality of domains has a domain status, and the graphical user interface is further configured to display each display element of the first plurality of display elements with a color indicating a status of a corresponding domain.

13. The apparatus of claim 11, wherein a domain of the plurality of domains is a depleted domain, and the graphical user interface is configured to cause a display element of the first plurality of display elements that corresponds to the depleted domain to pulsate.

14. The apparatus of claim 11, wherein a domain of the plurality of domains is a depleted domain, and the graphical user interface is configured to cause a display element of the first plurality of display elements that corresponds to the depleted domain to fill an entire view screen of the graphical user interface.

15. The apparatus of claim 11, wherein the graphical user interface is configured to:

receive a user interaction with a display element of the plurality of display elements; and cause the display element to fill an entire view screen of the graphical user interface.

16. The apparatus of claim 11, wherein the members of the group are within a same department.

17. The apparatus of claim 11, further comprising selecting members of the group based at least on one critical domain.

18. The apparatus of claim 11, wherein extracting the critical domain data further comprises extracting the critical domain data using natural language processing.

19. The apparatus of claim 11, wherein generating the one or more recommendations comprises generating the one or more recommendations for each member of the group.

20. The apparatus of claim 11, wherein the one or more recommendations for the group are available for an entirety of the group.

* * * * *